US012463296B2

(12) United States Patent
Tsushima et al.

(10) Patent No.: US 12,463,296 B2
(45) Date of Patent: Nov. 4, 2025

(54) BATTERY ELECTRODE, BATTERY, AND BATTERY ELECTRODE MANUFACTURING METHOD

(71) Applicant: Panasonic Intellectual Property Management Co., Ltd., Osaka (JP)

(72) Inventors: Tatsuya Tsushima, Hyogo (JP); Katsuya Shiozaki, Hyogo (JP); Ryosuke Iwata, Hyogo (JP); Yuma Kamiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 456 days.

(21) Appl. No.: 17/261,991

(22) PCT Filed: Jun. 26, 2019

(86) PCT No.: PCT/JP2019/025282
§ 371 (c)(1),
(2) Date: Jan. 21, 2021

(87) PCT Pub. No.: WO2020/026649
PCT Pub. Date: Feb. 6, 2020

(65) Prior Publication Data
US 2021/0351484 A1  Nov. 11, 2021

(30) Foreign Application Priority Data

Jul. 30, 2018  (JP) .................................. 2018-142478

(51) Int. Cl.
H01M 50/533  (2021.01)
H01M 4/04  (2006.01)
(Continued)

(52) U.S. Cl.
CPC ......... *H01M 50/533* (2021.01); *H01M 4/043* (2013.01); *H01M 4/66* (2013.01); *H01M 50/531* (2021.01); *H01M 4/70* (2013.01)

(58) Field of Classification Search
CPC .. H01M 50/533; H01M 50/531; H01M 4/043; H01M 4/466; H01M 4/70
See application file for complete search history.

(56) References Cited

U.S. PATENT DOCUMENTS

2007/0072082 A1*  3/2007  Scott ..................... H01M 4/043
429/231.95
2018/0175335 A1*  6/2018  Muroya .............. H01M 50/169
(Continued)

FOREIGN PATENT DOCUMENTS

CN    108140869 A    6/2018
JP    2001-126708 A   5/2001
(Continued)

OTHER PUBLICATIONS

English Translation of JP2013073757A, Electrode plate and wound type electrode battery; Panasonic Corp, Apr. 22, 2013 (Year: 2013).*
(Continued)

*Primary Examiner* — Adam J Francis
(74) *Attorney, Agent, or Firm* — WHDA, LLP

(57) ABSTRACT

A battery electrode which is one example of an embodiment is provided with a core and an active material layer disposed on the surface of the core. The core has a based part where the core surface is covered by the active material layer and a tab part projecting from the based part. Notches are formed on the core from the base of the tab part to the base part, or at positions where the base part adjoins the tab part. The edge of each notch is formed from a first curve comprising a first arc and either a second curve comprising a second arch having a smaller curvature than the first arc or a straight line. This allows a battery electrode to be provided such that (Continued)

the occurrence of cracks at the base of the tab part of the core and in the vicinity thereof can be sufficiently suppressed.

13 Claims, 5 Drawing Sheets

(51) Int. Cl.
  *H01M 4/66* (2006.01)
  *H01M 4/70* (2006.01)
  *H01M 50/531* (2021.01)

(56) References Cited

U.S. PATENT DOCUMENTS

| | | | |
|---|---|---|---|
| 2018/0269458 A1* | 9/2018 | Oh | H01M 50/124 |
| 2020/0185700 A1* | 6/2020 | Kamiyama | H01M 10/054 |
| 2020/0321658 A1* | 10/2020 | Fukunaga | H01M 10/0585 |
| 2021/0280952 A1* | 9/2021 | Wakimoto | H01M 50/147 |

FOREIGN PATENT DOCUMENTS

| | | | | |
|---|---|---|---|---|
| JP | 2013-73757 A | | 4/2013 | |
| JP | 2013073757 A | * | 4/2013 | |
| JP | 2014-22102 A | | 2/2014 | |
| JP | 2014022102 A | * | 2/2014 | |
| WO | WO-2017104956 A1 | * | 6/2017 | ............ H01M 10/04 |
| WO | 2017/204184 A1 | | 11/2017 | |
| WO | WO-2018021372 A1 | * | 2/2018 | ............ H01M 10/04 |

OTHER PUBLICATIONS

English Translation of JP2014022102A, Power storage device and secondary battery and manufacturing method for electrode; Toyota IND Corp; Feb. 3, 2014 (Year: 2014).*
English translation of JP 2013073757 A—provided in the previous office action; Panasonic corp; Apr. 22, 2013 (Year: 2013).*
International Search Report dated Sep. 17, 2019, issued in counterpart International Application No. PCT/JP2019/025282 (2 pages).
English Translation of Chinese Search Report dated Dec. 1, 2023, issued in counterpart CN application No. 201980042162.2. (3 pages).

* cited by examiner

BATTERY ELECTRODE, BATTERY, AND BATTERY ELECTRODE MANUFACTURING METHOD

TECHNICAL FIELD

The present disclosure relates to a battery electrode, a battery and a battery electrode manufacturing method.

BACKGROUND ART

A battery electrode generally comprises an electrode current collector made of metal and an active material layer provided on a surface of the electrode current collector. The electrode current collector has a based portion in which the electrode current collector surface is covered by the active material layer, and a tab portion projecting from the based portion. Patent Literature 1 discloses a battery electrode with cutouts formed in a root of a tab portion of an electrode current collector and a vicinity thereof. Also, Patent Literature 1 discloses that cracking of the electrode current collector can effectively be curbed by compressing an active material layer after provision of the cutouts in the root of the tab portion and the vicinity of the root.

CITATION LIST

Patent Literature

PATENT LITERATURE 1: International Publication No. WO 2017/204184

SUMMARY

A volumetric energy density of a battery can be enhanced by an increase in packing density of each active material layer via compression of the active material layer with a strong force. However, strong compression of the active material layer may cause cracking in a root of a tab portion of a relevant electrode current collector and a vicinity thereof. Also, cracking may occur in the root of the tab portion of the electrode current collector and the vicinity thereof due to expansion and contraction of the active material layer along with charging and discharging of the battery. The electrode disclosed in Patent Literature 1 can be expected to exert an effect of curbing such cracking; however, as a result of the present inventors' study, it has turned out that there is still room for improvement.

A battery electrode according to an aspect of the present disclosure is a battery electrode comprising an electrode current collector, and an active material layer provided on a surface of the electrode current collector, wherein the electrode current collector has a based portion in which the electrode current collector surface is covered by the active material layer and a tab portion projecting from the based portion. In the electrode current collector, a cutout is formed from a root of the tab portion to the based portion or in a part of the based portion, the part being adjacent to the tab portion. An edge of the cutout is formed by a first curve including a first arc, and a second curve including a second arc that is smaller in curvature than the first arc or a straight line.

A battery according to an aspect of the present disclosure comprises the above battery electrode.

A battery electrode manufacturing method according to an aspect of the present disclosure is a method for manufacturing a battery electrode comprising an electrode current collector and an active material layer provided on a surface of the electrode current collector, the electrode current collector having a based portion in which the electrode current collector surface is covered by the active material layer and a tab portion projecting from the based portion, the method comprising: providing the active material layer on at least a surface of the based portion or a part that is to be the based portion; forming a cutout from a root of the tab portion or a part that is to be the tab portion to the based portion or a part that is to be the based portion, or in an adjacent part, which is adjacent to the tab portion, of the based portion or a part that is to be the adjacent part, wherein an edge of the cutout is formed by a first curve including a first arc, and a second curve, which includes a second arc that is smaller in curvature than the first arc, or a straight line; and compressing the active material layer after the formation of the cutout.

The battery electrode according to an aspect of the present disclosure enables sufficiently curbing cracking of a root of a tab portion of an electrode current collector and a vicinity thereof.

DESCRIPTION OF EMBODIMENTS

In recent years, secondary batteries such as lithium ion batteries have been used as drive power sources for, e.g., electric vehicles (EV) and hybrid electric vehicles (HEV, PHEV), and thus, there is an increasing demand for enhancement in volumetric energy density of batteries. As mentioned above, a method in which an active material layer is compressed with a strong force to increase a packing density of the active material layer is conceivable as a method for increasing a volumetric energy density of a battery. However, in this case, cracking may occur in a root of a tab portion of an electrode current collector and a vicinity thereof.

When the active material layer is compressed with a strong force, not only the active material layer but also the electrode current collector is strongly compressed, and thus, the electrode current collector is rolled out. At this time, although a part with the active material layer provided thereon (based portion) of the electrode current collector is rolled out, an electrode current collector exposed part (tab portion) is smaller in thickness than the part with the active material layer thereon and thus is not rolled out because of no load of the compression being applied to the electrode current collector exposed part. Therefore, in the electrode current collector, a difference in length occurs between the part with the active material layer provided thereon and the electrode current collector exposed part with the active material layer not provided thereon, which causes cracking in the root of the tab portion of the electrode current collector and the vicinity thereof. Also, cracking may occur in the root of the tab portion of the electrode current collector and the vicinity thereof due to expansion and contraction of the active material layer along with charging and discharging of the battery.

As a result of diligent study to curb such cracking, the present inventors have finally created an electrode structure having a cutout defined by a first curve formed of a first arc and a second curve of a second arc that is smaller in curvature than the first arc or a straight line from a root of a tab portion to a based portion or in a part of the based portion, the part being adjacent to the tab portion. As described in detail below, cracking is specifically curbed by the cutout.

Figure 1:
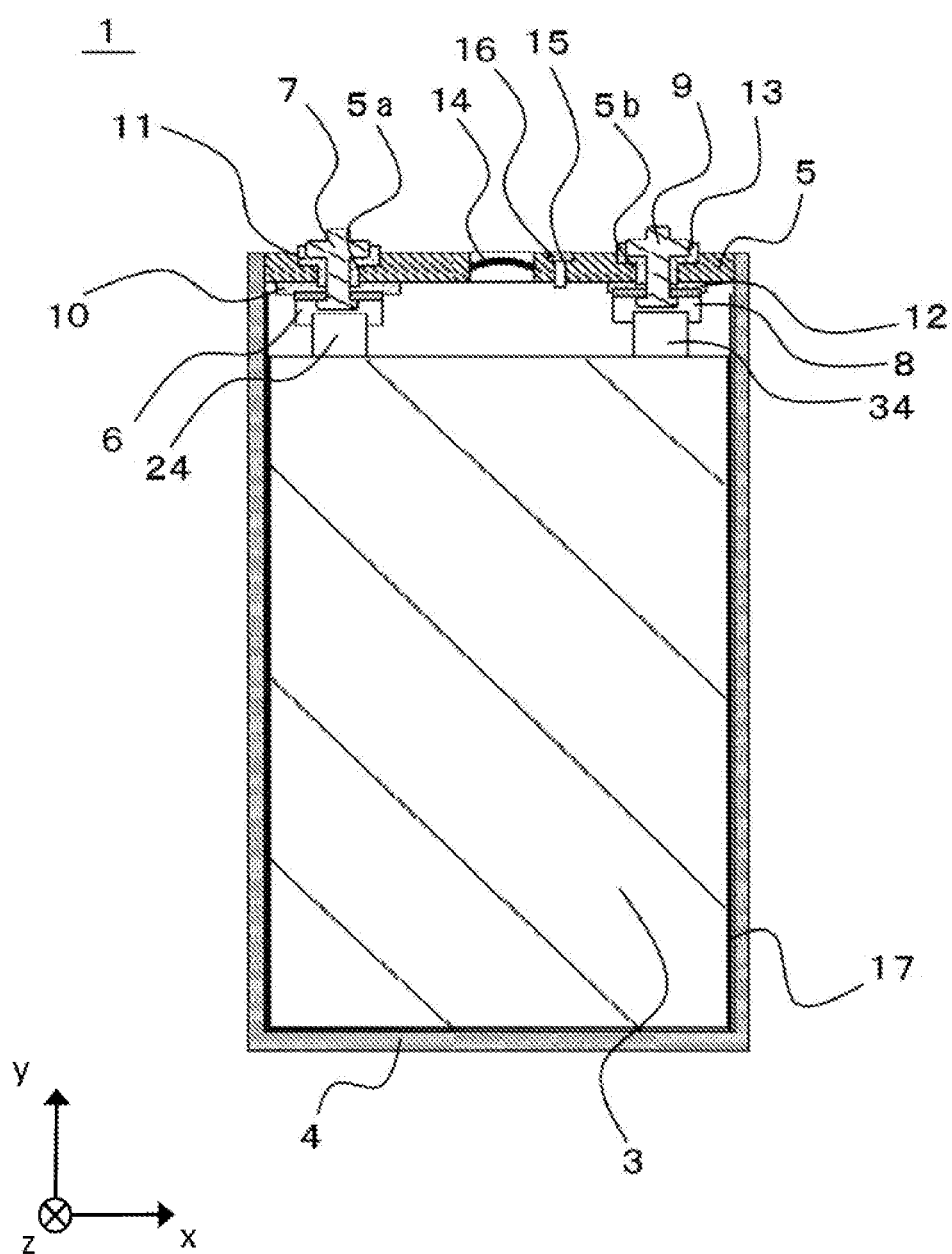
FIG. 1 is a sectional view of a battery that is an example of an embodiment.
Figure 2:
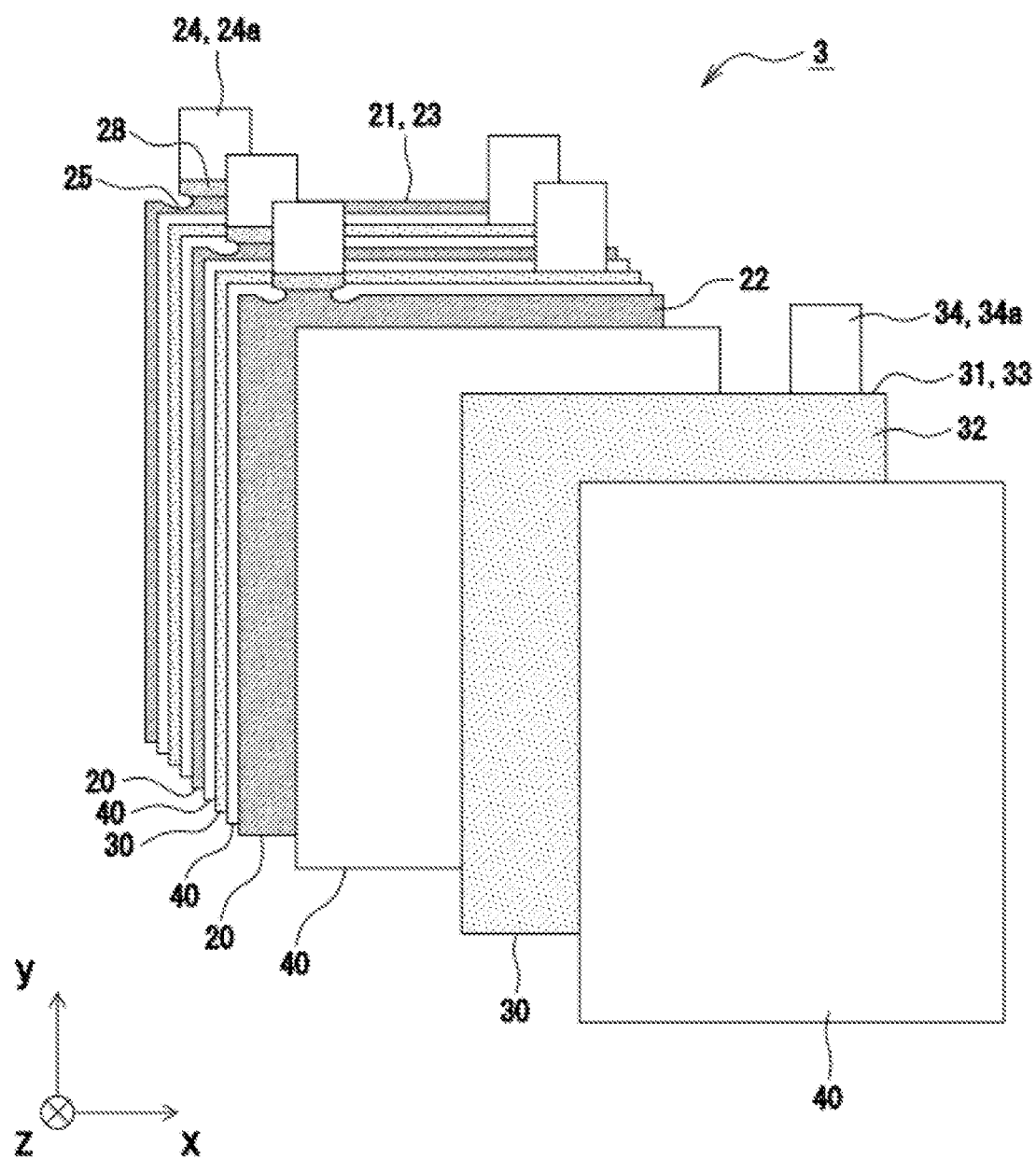
FIG. 2 is an exploded perspective view of an electrode assembly that is an example of the embodiment.
Figure 3:
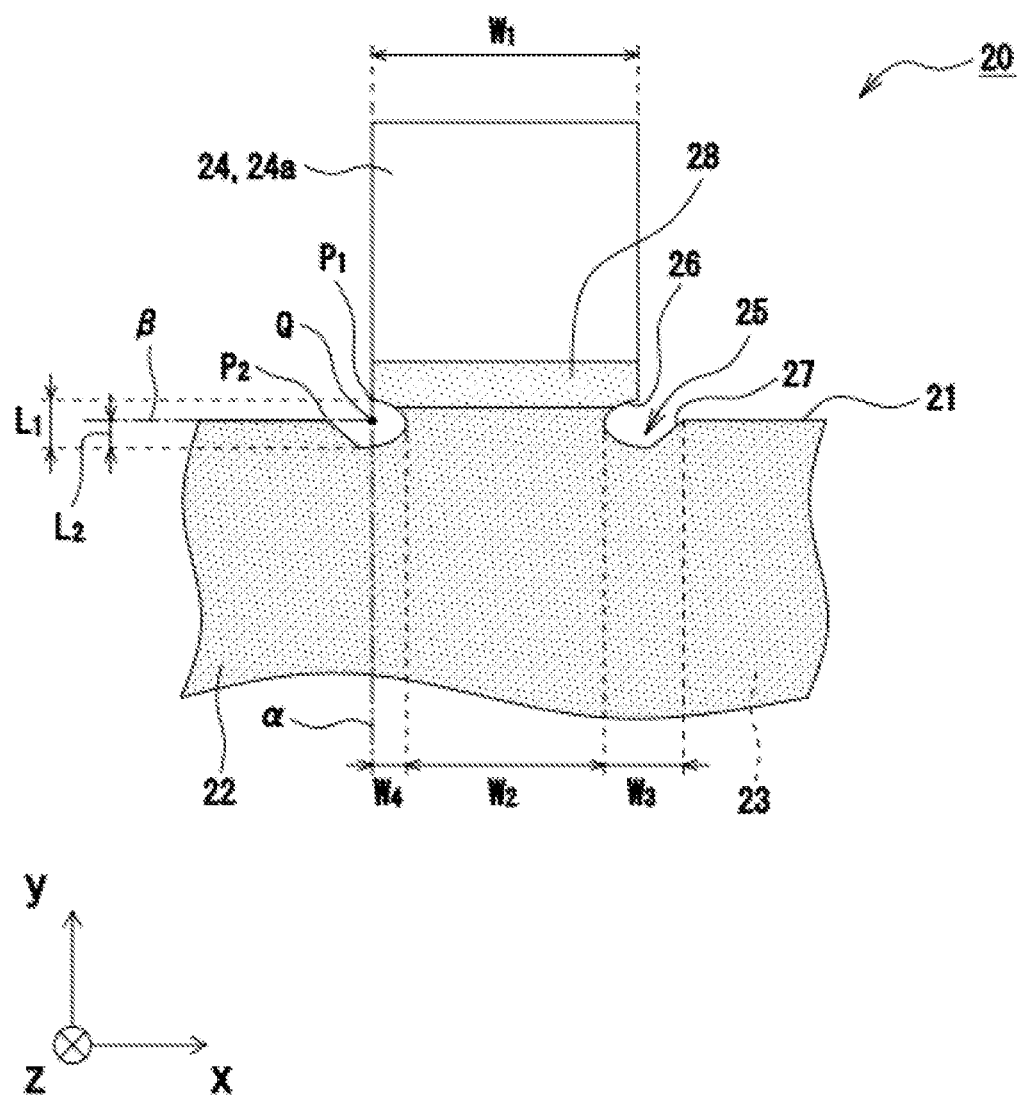
FIG. 3 is an enlarged view of a positive-electrode tab portion and a vicinity thereof in a positive electrode that is an example of the embodiment.

An example of an embodiment of the present disclosure will be described in detail below. Note that a battery electrode, a battery, and a battery electrode manufacturing method according to the present disclosure are not limited to the below-described embodiment. Since the drawings referred to in the description of the embodiment are schematic ones, e.g., dimensional ratios between components drawn in the drawings should be determined taking the below description into consideration. In FIGS. 1 to 3, a z-direction is a direction of stacking of electrodes forming an electrode assembly 3 (thickness direction of the electrodes), an x-direction is a direction in which a positive electrode terminal 7 and a negative electrode terminal 9 are arranged side by side and a y-direction is a direction orthogonal to the x- and z-directions. For convenience of description, the x-direction may be referred to as "transverse direction" and the y-direction may be referred to as "up-down direction".

FIG. 1 is a sectional view of a battery 1 that is an example of an embodiment. As illustrated in FIG. 1, the battery 1 comprises an outer covering body 4 that is bottomed and has an opening, and a sealing plate 5 that closes the opening. The outer covering body 4 is a bottomed rectangular tubular container, and in the outer covering body 4, a stack-type electrode assembly 3 is housed together with an electrolyte (not illustrated). The sealing plate 5 is a lid body that closes the opening of the outer covering body 4, and in the sealing plate 5, a positive electrode terminal 7, a negative electrode terminal 9, a gas discharge valve 14, an electrolytic solution injection hole 15 for injecting an electrolytic solution and a sealing plug 16 for sealing the electrolytic solution injection hole 15 are provided. The gas discharge valve 14 has a function that when pressure inside the battery reaches a predetermined value or more, breaks and discharges gas inside the battery to the outside of the battery.

The electrolyte may be either an aqueous electrolyte or a non-aqueous electrolyte. In the present embodiment, a non-aqueous electrolyte is used. The battery 1 is a non-aqueous electrolyte secondary battery, for example, a lithium ion battery. The non-aqueous electrolyte contains a non-aqueous solvent and an electrolyte salt dissolved in the non-aqueous solvent. For the non-aqueous solvent, for example, any of esters, ethers, nitriles, amides and solvents of mixtures of two or more thereof may be used. The non-aqueous solvent may contain a halogen substitution product resulting from substitution of at least a part of hydrogens in any of these solvents with a halogen atom such as fluorine. Note that the non-aqueous electrolyte is not limited to a liquid electrolyte but may be a solid electrolyte. For the electrolyte salt, for example, a lithium salt such as $LiPF_6$ is used.

The positive electrode terminal 7 has a function that electrically connects an external element and positive electrodes. The negative electrode terminal 9 has a function that electrically connects the external element and negative electrodes. The positive electrode terminal 7 is attached to the sealing plate 5 in a positive electrode terminal attachment hole 5a provided in the sealing plate 5 in such a manner that the positive electrode terminal 7 is electrically insulated from the sealing plate 5 by insulating members 10, 11. Also, the negative electrode terminal 9 is attached to the sealing plate 5 in a negative electrode terminal attachment hole 5b provided in the sealing plate 5 in such a manner that the negative electrode terminal 9 is electrically insulated from the sealing plate 5 by insulating members 12, 13.

The electrode assembly 3 is housed in the outer covering body 4 in such a manner that side surfaces and a bottom surface are covered by an insulating sheet 17. For the insulating sheet 17, for example, one folded in a box shape so as to extend along inner walls of the outer covering body 4 or a pouch-shaped one covering the electrode assembly 3 can be used. Although in the present embodiment, the stack-type electrode assembly 3 is housed in the rectangular outer covering body 4 made of metal, the electrode assembly may be of a wound type and the outer covering body may be formed of a laminating film.

The electrode assembly 3 is disposed inside the outer covering body 4 in such a manner that positive-electrode tab portions 24 and negative-electrode tab portions 34 extend to the sealing plate 5 side. The positive-electrode tab portions 24 are disposed on one end side in the x-direction of the outer covering body 4, are aligned with the positive electrode terminal 7 in the y-direction and are electrically connected to that terminal via a positive-electrode current collector 6. The negative-electrode tab portions 34 are disposed on the other end side in the x-direction of the outer covering body 4, are aligned with the negative electrode terminal 9 in the y-direction and are electrically connected to that terminal via a negative-electrode current collector 8. A current blocking mechanism may be provided in a conducting pathway between the positive electrodes and the positive electrode terminal 7 or a conducting pathway between the negative electrodes and the negative electrode terminal 9. The current blocking mechanism has a function that when the pressure inside the battery reaches a predetermined value or more, operates to shut off the conducting pathway.

FIG. 2 is an exploded perspective view of the electrode assembly 3. As illustrated in FIG. 2, the electrode assembly 3 has a stacked structure in which a plurality of positive electrodes 20 and a plurality of negative electrodes 30 are alternately stacked on a one-by-one basis via respective separators 40. Unlike a wound-type electrode assembly formed by winding a positive electrode and a negative electrode, in the stack-type electrode assembly 3, electrodes are not bent and dead space is small in comparison with the wound-type electrode assembly. Therefore, in the stack-type electrode assembly 3, a packing density of active material layers can be increased and thus an energy density of the battery can easily be enhanced in comparison with the round-type electrode assembly.

Each positive electrode 20 comprises a positive-electrode electrode current collector 21 and a positive-electrode active material layer 22 provided on a surface of the positive-electrode electrode current collector 21. The positive-electrode active material layer 22 is preferably provided on each of opposite surfaces of the positive-electrode electrode current collector 21. The positive-electrode electrode current collector 21 has a positive-electrode base portion 23 in which the electrode current collector surface is covered by the positive-electrode active material layer 22, and a positive-electrode tab portion 24 projecting from the positive-electrode base portion 23. In the positive-electrode tab portion 24 the positive-electrode active material layer 22 is not provided but there is an exposed part 24*a* in which the electrode current collector surface is exposed.

Each negative electrode 30 comprises a negative-electrode electrode current collector 31 and a negative-electrode active material layer 32 provided on a surface of the negative-electrode electrode current collector 31. The negative-electrode active material layer 32 is preferably provided in each of opposite sides of the negative-electrode electrode current collector 31. The negative-electrode electrode current collector 31 has a negative-electrode base portion 33 in which the electrode current collector surface is covered by the negative-electrode active material layer 32, and a negative-electrode tab portion 34 projecting from the negative-electrode base portion 33. In the negative-electrode tab portion 34, the negative-electrode active material layer 32 is not provided but there is an exposed part 34*a* in which the electrode current collector surface is exposed.

In the present embodiment, the positive-electrode active material layer 22 is provided over an entire area of each of opposite surfaces of the positive-electrode base portion 23. Generally, a positive electrode 20 is manufactured by providing a positive-electrode active material layer 22 on a surface of a metal foil or the like that is to be a positive-electrode electrode current collector 21 and then cutting the metal foil or the like into a shape and a size of the electrode, and thus, the positive-electrode active material layer 22 slightly remains also in a root of a positive-electrode tab portion 24. Likewise, the negative-electrode active material layer 32 is provided over an entire area of each of opposite surfaces of the negative-electrode base portion 33 and slightly remains also in a root of the negative-electrode tab portion 34.

Each of the positive-electrode base portions 23, the positive-electrode tab portions 24, the negative-electrode base portions 33 and the negative-electrode tab portions 34 is formed, for example, in a substantially quadrilateral shape. In the example illustrated in FIG. 2, as each positive electrode 20 is viewed from the thickness direction (z-direction), a positive-electrode tab portion 24 projects from one end side of one edge (upper edge) of a positive-electrode base portion 23. Also, a negative-electrode tab portion 34 projects from the other end side of one edge (upper edge) of a negative-electrode base portion 33. In other words, the respective tab portions of the positive electrodes 20 and the negative electrodes 30 extend in a same direction (direction toward the sealing plate 5) and the positive-electrode tab portions 24 and the negative-electrode tab portions 34 are disposed so as to be located on the respective sides opposite to each other in the x-direction. Note that in the case of a lithium ion battery, in order to prevent deposition of lithium ions, the negative-electrode base portions 33 are formed so as to have an area that is larger than that of the positive-electrode base portions 23, and the positive electrodes 20 and the negative electrodes 30 are disposed in such a manner that the entire positive-electrode active material layers 22 face the respective negative-electrode active material layers 32.

In each positive-electrode electrode current collector 21, a cutout 25 is formed from the root of the positive-electrode tab portion 24 to the positive-electrode base portion 23. In each positive electrode 20, cracking that easily occurs in the root of the positive-electrode tab portion 24 and a vicinity thereof is sufficiently curbed by the cutout 25. Although in the present embodiment, a cutout 25 is formed in each of the positive-electrode electrode current collectors 21 only but a cutout 25 may be formed in each of the negative-electrode electrode current collectors 31. The battery electrode comprising a cutout according to the present disclosure may be applied to positive electrodes only or may be applied to negative electrodes only, or may be applied to both of positive electrodes and negative electrodes.

The positive electrodes 20, the negative electrodes 30 and the separators 40 forming the electrode assembly 3, particularly, the positive electrodes 20 each including a cutout 25, will be described in detail below.

[Positive Electrodes]

As described above, each positive electrode 20 comprises a positive-electrode electrode current collector 21 and a positive-electrode active material layer 22 provided on each of opposite surfaces of the positive-electrode electrode current collector 21. For the positive-electrode electrode current collector 21, e.g., a foil of a metal that is stable within a potential range of the positive electrodes such as aluminum or an aluminum alloy or a film with the metal disposed on a surface layer thereof can be used. The positive-electrode active material layer 22 contains a positive-electrode active material, a binder, and a conductive agent. Each positive electrode 20 can be manufactured by, for example, applying a positive electrode mixture slurry containing, e.g., a positive-electrode active material, a binder, and a conductive agent to a positive-electrode electrode current collector 21, drying the resulting coating films and compressing positive-electrode active material layers 22 that are the dried coating films via a roller.

The positive-electrode active material is formed using a lithium-containing metal composite oxide as a main component. Examples of a metal element contained in the lithium-containing metal composite oxide can include, e.g., Ni, Co, Mn, Al, B, Mg, Ti, V, Cr, Fe, Cu, Zn, Ga, Sr, Zr, Nb, In, Sn, Ta, W, Ca, Sb, Pb, Bi and Ge. A preferable example of the lithium-containing metal composite oxide is a composite oxide containing at least one of Ni, Co, Mn, and Al.

Examples of the conductive agent contained in the positive-electrode active material layer 22 can include carbon materials such as carbon black, acetylene black, ketjen black, and graphite. Examples of the binder contained in the positive-electrode active material layer 22 can include fluorine resins such as polytetrafluoroethylene (PTFE) and polyvinylidene fluoride (PVDF), polyacrylonitrile (PAN), polyimide, acrylic resins, and polyolefin. Any of these resins and, e.g., carboxymethyl cellulose (CMC) or a salt thereof or polyethylene oxide (PEO) may be used together.

The packing density of each positive-electrode active material layer 22 can appropriately be changed according to, e.g., usage of the battery 1, and in each positive electrode, the packing density can be enhanced by a function of the cutout 25. The packing density of each positive-electrode active material layer 22 is, for example, no less than 3.65 g/cm$^3$ and may be adjusted within a range of 3.65 g/cm$^3$ to 3.85 g/cm$^3$. An effect of the cutout 25 is more significantly exerted when the packing density of the positive-electrode active material layer 22 is high. Also, although a thickness of each positive-electrode active material layer 22 is not specifically limited, as an example, the thickness is 10 μm to 150 μm or 30 μm to 80 μm on one side of the positive-electrode electrode current collector 21.

In the present embodiment, a protection layer 28 is provided on the root of each positive-electrode tab portion 24. The protection layer 28 is provided within a range in which the protection layer 28 faces the corresponding negative electrode 30 via the corresponding separator 40, the range being a part, in which the positive-electrode active material layer 22 is not provided, of the root of each positive-electrode tab portion 24. Also, the protection layer 28 is provided adjacent to the positive-electrode active material layer 22 with no gap between the protection layer 28 and the positive-electrode active material layer 22. The provision of the protection layer 28 can curb, for example, low-resistant short-circuiting that can occur as a result of an entry of a conductive foreign object between the positive-electrode tab portion 24 and the negative electrode 30 and also reinforces the root of the positive-electrode tab portion 24 and thereby curbs breakage of the positive-electrode electrode current collector 21. The protection layer 28 is provided on each of opposite surfaces of the positive-electrode tab portion 24 at the root of the positive-electrode tab portion 24. A thickness of the protection layer 28 is smaller than the thickness of the positive-electrode active material layer 22, and for example, is 1 μm to 10 μm on one side of the positive-electrode electrode current collector 21.

The protection layer 28 may be formed of a resin alone but preferably contains inorganic particles and a binder. The protection layer 28 containing inorganic particles as a main component does not easily break even an entered conductive foreign object strongly abuts against the protection layer 28. Specific examples of the inorganic particles can include at least one selected from aluminum oxide (alumina), titanium oxide (titania), manganese oxide and silicon oxide (silica). Among these, alumina or titania is preferably used. For the binder contained in the protection layer 28, a binder of a type that is the same as that used in the positive-electrode active material layers 22 can be used. Note that a conductive agent may be added in the protection layer 28.

The cutout 25 formed in the root of each positive-electrode tab portion 24 and the vicinity thereof will be described in detail below with reference to FIG. 3. FIG. 3 is an enlarged view of a positive-electrode tab portion 24 and a vicinity thereof in a positive electrode 20.

As illustrated in FIG. 3, a cutout 25 is formed from a root of a positive-electrode tab portion 24 to a positive-electrode base portion 23 in each positive-electrode electrode current collector 21. Then, an edge of the cutout 25 is formed by a curve 26 (first curve) formed of an arc (first arc) and a straight line 27. In other words, in the root of the positive-electrode tab portion 24 and the vicinity thereof, a cutout 25 defined by a curve 26 and a straight line 27 is formed as the positive electrode 20 is viewed from the thickness direction (z-direction). Note that instead of the straight line 27, a second curve formed of a second arc that is smaller in curvature than the first arc may be used. For example, the curvature of the second curve is less than 50% of the curvature of the first curve and the second curve may be a slight curve that is close to the straight line 27.

The cutout 25 curbs occurrence of cracking in the root of the positive-electrode tab portion 24 and the vicinity thereof when a positive-electrode active material layer 22 is compressed and at the time of charging/discharging. Where no cutout 25 is provided, if an active material layer is strongly compressed, a part, in which the active material layer is provided, of the electrode current collector stretches but a part, in which the active material layer is not provided, of the electrode current collector does not stretch, and thus, for example, large stress acts on a boundary part between the parts, which may cause developing a crack from a corner between the tab portion and the based portion to the electrode current collector. Formation of the cutout 25 in the positive-electrode electrode current collector 21 can reduce stress generated because of the difference in stretch of the positive-electrode electrode current collector 21 and thus can curb occurrence of cracking.

As a result of the present inventors' study, it has turned out that a probability of occurrence of cracking largely changes depending on the shape of the cutout 25. A cutout 25 defined by a curve 26 and a straight line 27 largely reduces a probability of occurrence of cracking in comparison with, for example, a cutout defined by a curve 26 alone. An increase in packing density of the positive-electrode active material layer 22 causes cracking to be more likely to occur, and the effect of the cutout 25 is more significant when the packing density is high.

A cutout 25 is formed in the root of each positive-electrode tab portion 24 and the vicinity thereof. The cutout 25 is formed in a part adjacent to the positive-electrode tab portion 24 in an upper end portion of the positive-electrode base portion 23, and extends to the transverse end portion side of the positive-electrode electrode current collector 21 across an imaginary line α that is an extension of a side edge of the positive-electrode tab portion 24. Here, the side edge is an edge portion of the positive-electrode tab portion 24 along the up-down direction (y-direction) in which the positive-electrode tab portion 24 projects. The cutout 25, an edge of which continues from the root of the positive-electrode tab portion 24 to the positive-electrode base portion 23 with no disconnection, is formed as a single cut portion. Therefore, in the positive-electrode electrode current collector 21, there is no acute-angle corner in a boundary part between the positive-electrode tab portion 24 and the positive-electrode base portion 23.

The cutout 25 is formed so as to have a size that prevents occurrence of a trouble such as a resistance increase while curbing cracking of the positive-electrode electrode current collector 21. As described above, since the positive-electrode tab portion 24 is formed in a substantially quadrilateral shape, a width of the positive-electrode tab portion 24 is smaller in the root in which the cutout 25 is formed than in a distal end. A width $W_1$ (length in the x-direction/transverse direction) in a part, in which the cutout 25 is not formed, of the positive-electrode tab portion 24 is, for example, 10 mm to 30 mm or 15 mm to 25 mm. A width $W_2$ of a part, in which the cutout 25 is formed, of the positive-electrode tab portion 24, that is, the smallest width of the positive-electrode tab portion 24 is, for example, 5 mm to 25 mm or 10 mm to 20 mm. Where the widths $W_1$, $W_2$ fall within the respective ranges, generally, no trouble such as a resistance increase occurs and it is possible to, while curbing generation of heat at the time of high-rate charging/discharging, curb wrinkling and deflection of the positive-electrode tab portion 24 due to the charging/discharging.

The cutout 25 is preferably formed from each of opposite sides in the width direction of the positive-electrode tab portion 24 to the positive-electrode base portion 23. The cutout 25 may be formed on one side in the width direction of the positive-electrode tab portion 24 alone, but preferably, one cutout 25 is formed on each of the opposite sides in the width direction of the positive-electrode tab portion 24. The two cutouts 25 are formed so as to, for example, be symmetrical to each other with respect to an imaginary line (not illustrated) extending in a center in the width direction of the positive-electrode tab portion 24. In other words, the two cutouts 25a are substantially the same in terms of a width $W_3$ (length in the x-direction/transverse direction) of the cutouts 25, a width $W_4$ of a part cut inward from the side edge of the positive-electrode tab portion 24 and later-described lengths $L_1$, $L_2$.

The width $W_3$ of the cutouts 25 are, for example, 10% to 60% or 15% to 40% of the width $W_1$ of the positive-electrode tab portion 24, and a specific example of the width $W_3$ is 3 mm to 15 mm. The width $W_4$ of the part cut inward is, for example, 1% to 25% or 5% to 20% of the width $W_1$ of the positive-electrode tab portion 24 and a specific example of the width $W_4$ is 1 mm to 10 mm. Where the widths $W_3$, $W_4$ fall within the respective ranges, it is possible to sufficiently curb occurrence of cracking in the root of the positive-electrode tab portion 24 and the vicinity thereof while curbing a capacity decrease due to reduction of the positive-electrode active material layers 22.

An edge of each cutout 25 includes a first end $P_1$ on the positive-electrode tab portion 24 side and a second end $P_2$ in the positive-electrode base portion 23. The first end $P_1$ is located at a point of intersection between the side edge of the positive-electrode tab portion 24 and the edge of the cutout 25 and the second end $P_2$ is located at a point of intersection between an upper edge of the positive-electrode base portion 23 and the edge of the cutout 25. A length $L_1$ in the up-down direction (y-direction) from the first end $P_1$ to a lower end of the cutout 25 is, for example, 1% to 30% of a length of the positive-electrode tab portion 24, and a specific example of the length $L_1$ is 1.5 mm to 7.5 mm. A length $L_2$ in the up-down direction from the upper edge of the positive-electrode base portion 23 to the lower end of the cutout 25 is, for example, 0.5% to 15% of the length of the positive-electrode tab portion 24, and a specific example of the length $L_2$ is 0.5 mm to 3.0 mm.

As the lengths $L_1$, $L_2$, particularly, the length $L_2$, are made to be longer, occurrence of cracking in the root of the positive-electrode tab portion 24 and the vicinity can more easily be curbed. However, where the length $L_2$ is made to be longer, the area of a cut-off part of the positive-electrode active material layer 22 becomes large, which results in a decrease in battery capacity. Therefore, it is important to determine the size of the cutout 25 in consideration of crack curbing and the capacity. The straight line 27 forming a part of the edge of the cutout 25 largely contributes not only to curbing of cracking but also to curbing of a capacity decrease. Where the lengths $L_1$, $L_2$ fall within the respective ranges, it is possible to sufficiently curb occurrence of cracking in the root of the positive-electrode tab portion 24 and the vicinity thereof while curbing a capacity decrease due to reduction of the cracking positive-electrode active material layers 22.

In the present embodiment, the protection layer 28 is provided on the root of each positive-electrode tab portion 24, and a part of each cutout 25 is formed in a part, in which the protection layer 28 is provided, of the positive-electrode tab portion 24. Formation of the cutout 25 in the part in which the protection layer 28 is provided enables curbing, the positive-electrode electrode current collector 21 breaking from the edge of the cutout 25. In the example illustrated in FIG. 3, the first end $P_1$ of the cutout 25 is located in the part in which the protection layer 28 is provided. Also, in the positive-electrode tab portion 24, an entirety of the cutout 25 is formed in the part in which the protection layer 28 is provided and a part in which the positive-electrode active material layer 22 is provided. In other words, the cutout 25 is not formed in the exposed part 24a.

The straight line 27 forming a part of the edge of the cutout 25 is formed from the second end $P_2$ on the positive-electrode base portion 23 side. Also, the curve 26 forming a part of the edge of the cutout 25 is formed from the first end $P_1$ on the positive-electrode tab portion 24 side. The curve 26 is formed so as to have a length enough to extend from the first end $P_1$ to the positive-electrode base portion 23 and is connected to the straight line 27. A point of intersection between the curve 26 and the straight line 27 is located, for example, at the lower end of the cutout 25. Here, the lower end of the cutout 25 is a position at which a length in the up-down direction from the first end $P_1$, which is an upper end of the cutout 25, is the largest.

The curve 26 is formed of a part of the first arc. The first arc may be an arc of a perfect circle or may be an arc of an ellipse; however, in order to efficiently prevent occurrence of cracking while curbing a capacity decrease, the first arc is preferably an arc of an ellipse. For example, a major axis of the elliptic extends in the transverse direction (x-direction) of the positive electrode 20 and a center of the elliptic is located on the second end $P_2$ side relative to an intersection point Q. Here, the intersection point Q is a point of intersection between the imaginary line α and an imaginary line β that is an extension of the upper edge of the positive-electrode base portion 23, and is a position at which a corner is formed where no cutout 25 is provided. The perfect circle or the ellipse corresponding to the first arc may be a perfect circle or an ellipse centered at the intersection point Q.

The straight line 27 is formed so as to have a length from the second end P2 of the cutout 25, the length preventing the straight line 27 from extending across the imaginary line α that is an extension of the side edge of the positive-electrode tab portion 24. In other words, a part of the positive-electrode base portion 23, the part overlapping the positive-electrode tab portion 24 in the up-down direction, the straight line 27 is not formed but only the curve 26 is formed. The curve 26 largely curves toward the center side in the width direction of the positive-electrode tab portion 24. The straight line 27 intersects with the upper edge of the positive-electrode base portion 23 at an obtuse angle and is formed obliquely from the second end $P_2$ toward the lower end of the cutout 25. The angle formed by the upper edge of the positive-electrode base portion 23 and the straight line 27 is, for example, 100° to 160° or 110° to 150°.

Note that the edge of the cutout 25 may include another curve or straight line in addition to the curve 26 and the straight line 27 as long as such other curve or straight line does not hinder an objective of the present disclosure. For example, a second straight line may be formed from the first end $P_1$ of the cutout 25.

Figure 4:
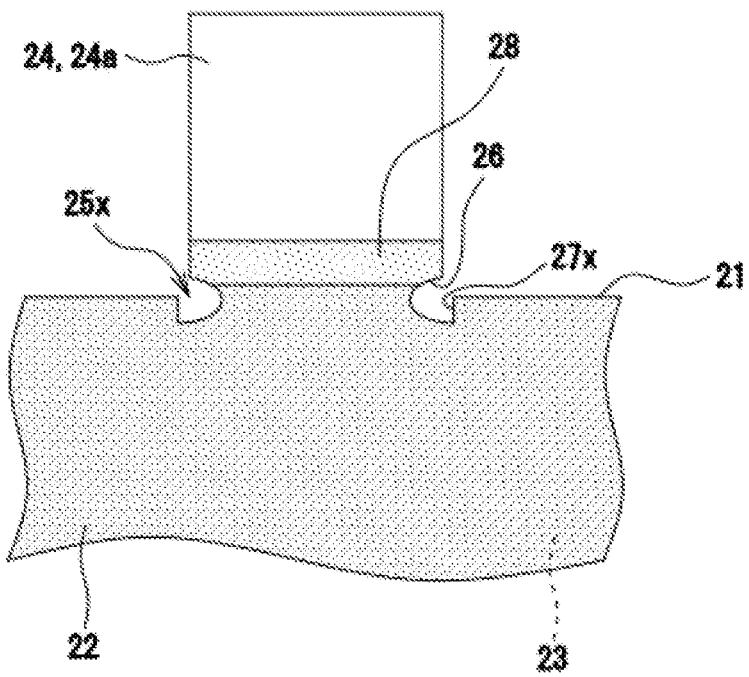
FIG. 4 is a diagram illustrating an alteration of cutouts.
Figure 5:
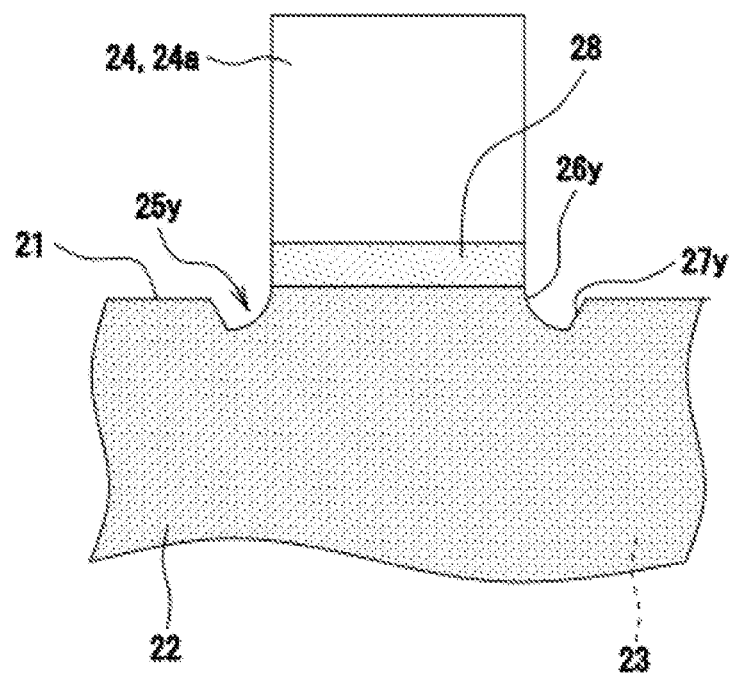
FIG. 5 is a diagram illustrating an alteration of cutouts.

FIGS. 4 and 5 illustrate cutouts 25x, 25y, each of which is another example of the embodiment. The cutouts 25x illustrated in FIG. 4 are in common with the cutouts 25 in that a part of an edge of each cutout 25x is formed, from a root of a positive-electrode tab portion 24 to a positive-electrode base portion 23, by a curve 26 formed of a part of an arc of an ellipse. However, the cutouts 25x are different from the cutouts 25 in that a remaining part of the edge of each cutout 25x is formed by a straight line 27x that substantially perpendicularly intersects with an upper edge of the positive-electrode base portion 23. The straight line 27x is formed from the upper edge of the positive-electrode base portion 23 to a lower end of the cutout 25x and an angle formed by the straight line 27x and the upper edge of the positive-electrode base portion 23 is approximately 90°. In this case, the area of a part cut off from a positive-electrode active material layer 22 can be reduced in comparison with that of the form illustrated in FIG. 3.

The cutouts 25y illustrated in FIG. 5 are in common with the cutouts 25, 25x in that each cutout 25y is defined by a curve 26y and a straight line 27y. However, the cutouts 25y are different from the cutouts 25, 25y in that each cutout 25y is formed only in a part of a positive-electrode base portion 23, the part adjacent to a positive-electrode tab portion 24, and is not formed in a root of the positive-electrode tab portion 24. Each curve 26y is formed so as to be continuous with a side edge of the positive-electrode tab portion 24. In this case, a width of the positive-electrode tab portion 24 is constant from a distal end to the root.

Here, an example of a method for manufacturing a positive electrode 20 comprising the above configuration will be described in detail.

A positive electrode 20 is manufactured through a process of providing a positive-electrode active material layer 22 on at least a surface of a positive-electrode base portion 23 of a positive-electrode electrode current collector 21 or a part that is to be the positive-electrode base portion 23, forming a cutout 25 from a root of a positive-electrode tab portion 24 or a part that is to be the positive-electrode tab portion 24 to the positive-electrode base portion 23 or the part that is to be the positive-electrode base portion 23, and compressing the positive-electrode active material layer 22 after the formation of the cutout 25. In forming the cutout 25, an edge of the cutout 25 is formed by a first curve formed of a first arc and a second curve formed of a second arc that is smaller in curvature than the first arc or a straight line. The cutout 25 may be formed after compression of the positive-electrode active material layer 22; however, in order to curb cracking of the positive-electrode electrode current collector 21, which can occur during compression of the active material layer, preferably, the cutout 25 is formed before compression of the active material layer. Also, from the perspective of, e.g., productivity, the cutout 25 is preferably formed after provision of the positive-electrode active material layer 22.

The positive electrode 20 is manufactured by cutting an elongated body with the positive-electrode active material layer 22 provided on each of opposite surfaces of an elongated electrode current collector that is to be the positive-electrode electrode current collector 21 (hereinafter referred to as "elongated body Z") into a predetermined shape and size in a subsequent process. An example of the process of manufacturing a positive electrode 20 includes: a first step of providing a positive-electrode active material layer 22 by applying a positive electrode mixture slurry to each of opposite surfaces of an elongated electrode current collector and drying the resulting coating films; a second step of forming a positive-electrode tab portion 24 and a cutout 25 by cutting an elongated body Z with the positive-electrode active material layer 22 provided on each of the opposite surfaces of the elongated electrode current collector; a third step of compressing the positive-electrode active material layer 22 (elongated body Z); and a fourth step of obtaining a positive electrode 20 by cutting the elongated body Z into a predetermined size.

In the first step, a positive-electrode active material layer 22 is provided by applying a positive electrode mixture slurry except a band-like electrode current collector exposed part extending along a longitudinal direction of an elongated electrode current collector. The exposed part is formed from an end in a width direction of the elongated electrode current collector so as to have a substantially constant width and becomes an exposed part 24a provided in a positive-electrode tab portion 24 in a subsequent process. Where a protection layer 28 is provided, simultaneously with the application of the positive electrode mixture slurry or in another step, a slurry for the protection layer 28 is applied to each of opposite surfaces of the elongated electrode current collector.

In the second step, the positive-electrode tab portion 24 is formed by cutting a part, in which the positive-electrode active material layer 22 is provided, of the elongated body Z along the exposed part and cutting the exposed part at a substantially constant cycle. A cutout 25 may be formed simultaneously with the formation of the positive-electrode tab portion 24 or may be formed after the formation of the positive-electrode tab portion 24. The elongated body Z can be cut via a conventionally known method, for example, mold pressing, a cutter or laser irradiation. Note that the elongated body Z can be cut along a position of a boundary between the part in which the positive-electrode active material layer 22 is provided and the exposed part; however, in this case, slight deviation of the cutting position unfavorably causes formation of an exposed part of the electrode current collector surface in a part other than the positive-electrode tab portion 24.

Also, the positive-electrode tab portion 24 and the cutout 25 may be formed via different methods. For example, the cutout 25 may be formed by forming the positive-electrode tab portion 24 via press punching and then performing irradiation with an energy ray such as laser. Where the cutout 25 is formed by means of laser irradiation, an edge portion of the cutout 25 is smoothed, which is advantageous for curbing cracking.

In the second step, the cutout 25 is formed by forming a curve 26 formed of a first arc and a straight line 27 in a root of the positive-electrode tab portion 24 (or a part that is to be the root of the positive-electrode tab portion 24) and the positive-electrode base portion 23 (or a part that is to be the positive-electrode base portion 23) and thereby cutting off a part of the elongated body Z. In the present embodiment, the curve 26 is formed from a part, in which the protection layer 28 is provided, of the root of the positive-electrode tab portion 24 to the positive-electrode base portion 23 and the straight line 27 is formed from an upper edge of the positive-electrode base portion 23 so as to be continuous with the curve 26. The curve 26 is formed as a part of the first arc of an elliptic and largely curves to the center side in the width direction of the positive-electrode tab portion 24. The straight line 27 intersects with the upper edge of the positive-electrode base portion 23 at an obtuse angle and is formed obliquely from the upper edge of the positive-electrode base portion 23 toward a lower end of the curve 26 (cutout 25).

In the third step, the positive-electrode active material layers 22 provided on the opposite surfaces of the elongated electrode current collector are compressed using a roller. The positive-electrode active material layers 22 can be compressed via a conventionally known method, and for example, is compressed by letting the elongated body Z through between a pair of rollers. A packing density of the positive-electrode active material layer 22 can be adjusted by, e.g., a composition and an amount of application of the positive electrode mixture slurry and/or pressure for compressing the positive-electrode active material layers 22. The packing density of the positive-electrode active material layer 22 is adjusted to, for example, no less than 3.65 g/cm$^3$; however, if the packing density is high, cracking is likely to occur in the root of the positive-electrode tab portion 24 and a vicinity thereof.

In the present manufacturing process, a probability of occurrence of cracking in the third step can substantially be reduced by compressing the positive-electrode active material layers 22 after formation of the cutout 25. As described above, the cutout 25 defined by a curve 26 and a straight line 27 reduces stress acting on the positive-electrode tab portion 24 and the vicinity thereof in the third step and thereby curbs occurrence of cracking.

[Negative Electrodes]

As described above, each negative electrode 30 has a negative-electrode electrode current collector 31 and a negative-electrode active material layer 32 provided each of opposite surfaces of the negative-electrode electrode current collector 31. For the negative-electrode electrode current collector 31, e.g., a foil of a metal that is stable within a potential range of the negative electrode 30 such as copper or a copper alloy or a film with the metal disposed on a surface layer thereof can be used. The negative-electrode active material layer 32 contains a negative-electrode active material and a binder. Each negative electrode 30 can be manufactured by, for example, applying a negative electrode mixture slurry containing, e.g., a negative-electrode active material and a binder to a negative-electrode electrode current collector 31, drying the resulting coating films and compressing negative-electrode active material layers 32 that are the dried coating films via a roller.

For the negative-electrode active material, generally, a carbon material that reversibly occludes and releases lithium ions. A preferable example of the carbon material is graphite that is natural graphite such as scaly graphite, bulk graphite or earthy graphite or artificial graphite such as bulk artificial graphite or graphitized mesophase carbon microbeads. Each negative-electrode active material layer 32 may contain an Si-containing compound as the negative-electrode active material. Also, for the negative-electrode active material, e.g., a metal to be alloyed with lithium other than Si, an alloy containing the metal or a compound containing the metal may be used.

For the binder contained in each negative-electrode active material layer 32, as in the case of the positive electrodes 20, e.g., a fluorine resin, PAN, a polyimide resin, an acrylic resin or a polyolefin resin may be used, but preferably, styrene-butadiene rubber (SBR) or a modified product thereof is used. Each negative-electrode active material layer may contain, for example, CMC or a salt thereof, a polyacrylic acid (PAA) or a salt thereof, or polyvinyl alcohol in addition to, e.g., SBR.

[Separator]

For the separator 40, a porous sheet having ion permeability and an insulation property is used. Specific examples of the porous sheet include, e.g., a microporous thin film, a woven fabric, and a non-woven fabric. For a material of the separator 40, e.g., an olefin-based resin such as polyethylene, polypropylene or a copolymer containing at least one of ethylene and propylene, or cellulose is favorable. The separator 40 may have a single-layer structure or a layer stack structure. On a surface of the separator 40, e.g., a heat-resistant layer may be formed.

EXAMPLES

The present disclosure will further be described below based on an example; however, the present disclosure is not limited to these examples.

Example 1

For a positive-electrode active material, a lithium nickel cobalt manganese composite oxide was used. A positive electrode mixture slurry was prepared by mixing the positive-electrode active material, PVdF and acetylene black at a mass ratio of 97.5:1:1.5 and adding a proper amount of N-methyl-2-pyrrolidone (NMP). The positive electrode mixture slurry was applied to each of opposite surfaces of an elongated electrode current collector formed of an aluminum foil having a thickness of 12 μm except a predetermined electrode current collector exposed part and the coating films were resulting dried to obtain an elongated body Z with a positive-electrode active material layer provided on each of the opposite surfaces of the elongated electrode current collector. Also, a protection layer containing alumina and PVdF was formed on a part of the electrode current collector exposed part, the part being adjacent to the positive-electrode active material layer.

Next, a part, in which the positive-electrode active material layer is provided, of the elongated body Z was cut along the electrode current collector exposed part and the electrode current collector exposed part was cut at a substantially constant cycle to form a tab portion having a width of 20 mm and a length of 19.6 mm. Subsequently, a cutout having the shape illustrated in FIG. 3, the cutout being defined by a curve and a straight line, was formed from each of opposite end portions in a width direction of a root of the tab portion to a based portion of the electrode current collector. The curve forming a part of an edge of the cutout was formed of a part of an arc of an ellipse having a major axis of 8 mm and a minor axis of 4 mm. The straight line forming a part of the edge of the cutout was formed so as to have a length of 3.5 mm from an upper edge of the based portion. An angle formed by the straight line and the upper edge of the based portion was 150°. Also, a width $W_2$ of the root of the tab portion in which the cutouts were formed was 14.6 mm, a width $W_3$ of the cutouts was 8 mm, a width $W_4$ was 2.7 mm, a length $L_1$ was 4 mm and a length $L_2$ was 2 mm.

Next, the positive-electrode active material layers were compressed by letting the elongated body Z with the cutouts formed therein through between a pair of rollers. Note that positive electrode (1) including positive-electrode active material layers having a packing density of 3.71 g/cm³ and positive electrode (2) including positive-electrode active material layers having a packing density of 3.8 g/cm³ were fabricated by adjusting an amount of application of the positive electrode mixture slurry and a force of compression of the elongated body Z. For each of the positive electrodes, whether or not a crack was developed in the tab portion and a vicinity thereof was confirmed and a result of evaluation was indicated in Table 1.

Comparative Example 1

Figure 6:
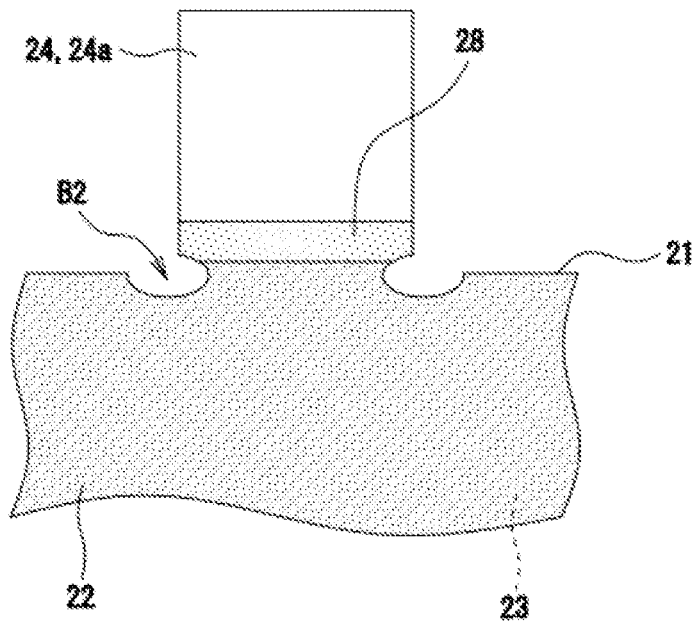
FIG. 6 is a diagram illustrating cutouts in comparative example 1.

Two types of positive electrodes including respective positive-electrode active material layers having different packing densities were manufactured in a manner that is similar to example 1 except that instead of the cutouts illustrated in FIG. 3, the cutouts illustrated in FIG. 6 (cutouts each defined by a curve formed of a part of an arc of an elliptic alone), and the above evaluation was performed. Note that a width $W_2$ of a root of a tab portion with the cutouts formed therein was 14.6 mm, a width $W_3$ of the cutouts was 8 mm, a width $W_4$ was 2.7 mm, a length $L_1$ was 4 mm and a length $L_2$ was 2 mm.

Comparative Example 2

Figure 7:
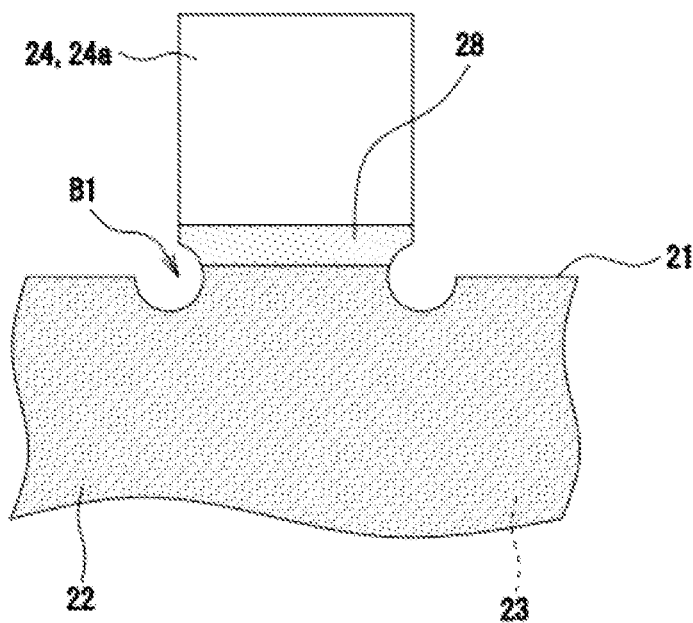
FIG. 7 is a diagram illustrating cutouts in comparative example 2.

Two types of positive electrodes including respective positive-electrode active material layers having different packing densities were manufactured in a manner that is similar to example 1 except that instead of the cutouts illustrated in FIG. 3, the cutouts illustrated in FIG. 7 (cutouts each defined by a curve formed of a part of an arc of a perfect circle alone), and the above evaluation was performed. Note that a width of a root of a tab portion with the cutouts formed therein was 14.6 mm, a width $W_3$ of the cutouts was 6 mm, a width $W_4$ was 2.7 mm, a length $L_1$ was 6 mm and a length $L_2$ was 3 mm.

TABLE 1

|  | Crack developed or not | | Effect on capacity |
| --- | --- | --- | --- |
|  | Positive electrode (1) | Positive electrode (2) |  |
| Example 1 | 0% (0/150) | 30% (15/50) | −0.16% |
| Comparative example 1 | 0% (0/20) | 83% (29/35) | −0.24% |
| Comparative example 2 | 20% (4/20) | — | −0.27% |

As indicated in Table 1, in example 1, as for positive electrode (1), no crack was observed (cracking occurrence rate: 0%), and as for positive electrode (2) including an active material layer having a high packing density, a cracking occurrence probability was suppressed to be low (30%). On the other hand, in comparative example 2, as for positive electrode (1), a crack was observed. In comparative example 1, as for positive electrode (1), no crack was observed but as for positive electrode (2), a cracking occurrence probability was high (83%). From these results, it can be understood that a probability of occurrence of cracking in a root of a tab portion and a vicinity thereof largely depends on the shape of the cutouts and the cutouts of example 1, each of which is defined by a curve and a straight line, substantially curb occurrence of such cracking. Furthermore, an effect of the positive electrodes of example 1 on a capacity is small in comparison with the positive electrodes of comparative examples 1, 2.

REFERENCE SIGNS LIST 1 battery
3 electrode assembly
4 outer covering body
5 sealing plate
5a positive electrode terminal attachment hole
5b negative electrode terminal attachment hole
6 positive-electrode current collector
7 positive electrode terminal
8 negative-electrode current collector
9 negative electrode terminal
10 to 13 insulating member
14 gas discharge valve
15 electrolytic solution injection hole
16 sealing plug
17 insulating sheet
20 positive electrode
21 positive-electrode electrode current collector
22 positive-electrode active material layer
23 positive-electrode base portion
24 positive-electrode tab portion
24a, 34a exposed part
25 cutout
26 curve
27 straight line
28 protection layer
30 negative electrode
31 negative-electrode electrode current collector
32 negative-electrode active material layer
33 negative-electrode base portion
34 negative-electrode tab portion
40 separator

The invention claimed is:

1. A battery electrode comprising an electrode current collector, and an active material layer provided on a surface of the electrode current collector, wherein:
  the electrode current collector has a based portion in which the electrode current collector surface is covered by the active material layer and a tab portion projecting from the based portion;
  a pair of cutouts are formed in the electrode current collector, wherein each of the pair of cutouts is formed in the based portion from a corresponding one of opposite end portions of a root of the tab portion in a width direction of the tab portion, or in a corresponding one of opposed parts of the based portion respectively adjacent to the corresponding one of the opposite end portions of the root of the tab portion in the width direction;
  an edge of said each of the pair of cutouts consists of a single curve and a single straight line,
  the edge of said each of the pair of cutouts has a first end thereof on the tab portion side and a second end thereof on the based portion side, wherein the single curve is formed from the first end and the single straight line is formed from the second end; and
  a portion of the electrode current collector surface interposed between the pair of cutouts in the width direction is covered by the active material layer formed thereon.

2. The battery electrode according to claim 1, wherein:
  said each of the pair of cutouts is formed from the root of the tab portion to the based portion; and
  a width of the tab portion is smaller in the root than in a distal end.

3. The battery electrode according to claim 1, wherein the single straight line is formed so as to have a length from the second end, the length preventing the single straight line from extending across a line that is an extension of a side edge of the tab portion.

4. The battery electrode according to claim 1, wherein the first curve is an arc of an ellipse.

5. The battery electrode according to claim 1, wherein a packing density of the active material layer is no less than 3.65 g/cm$^3$.

6. The battery electrode according to claim 1, further comprising a protection layer provided on the root of the tab portion,
  wherein a part of said each of the pair of cutouts is formed in a part in which the protection layer is provided.

7. A battery comprising the battery electrode according to claim 1.

8. The battery according to claim 7, wherein the battery electrode is a positive electrode.

9. A method for manufacturing a battery electrode comprising an electrode current collector and an active material layer provided on a surface of the electrode current collector, the electrode current collector having a based portion in which the electrode current collector surface is covered by the active material layer and a tab portion projecting from the based portion, the method comprising:
  providing the active material layer on at least a surface of the based portion or a part that is to be the based portion;
  forming a pair of cutouts in the electrode current collector, each of the pair of cutouts being formed in the based portion from a corresponding one of opposite end portions of the root of the tab portion in a width direction of the tab portion, or in a corresponding one of opposed parts of the based portion respectively adjacent to the corresponding one of the opposite end portions in the width direction, wherein an edge of said each of the pair of cutouts consists of a single curve and a single straight line, the edge of said each of the pair of cutouts has a first end thereof on the tab portion side and a second end thereof on the based portion side, wherein the single curve is formed from the first end and the single straight line is formed from the second end; and compressing the active material layer after the formation of the cutout, wherein a portion of the electrode current collector surface interposed between the pair of cutouts in the width direction is covered by the active material layer formed thereon.

10. The battery electrode according to claim 1, wherein an angle formed by the single straight line and an edge of the based portion connected to the second end of the edge of said each of the cutouts is 100° to 160°.

11. The battery electrode according to claim 10, wherein the angle formed by the single straight line and the edge of the based portion is 110° to 150°.

12. The method according to claim 9, wherein:

an angle formed by the single straight line and an edge of the based portion connected to the second end of the edge of said each of the cutouts is 100° to 160°.

13. The battery electrode according to claim 12, wherein the angle formed by the single straight line and the edge of the based portion is 110° to 150°.

* * * * *